(12) United States Patent
Goetzl et al.

(10) Patent No.: US 9,066,204 B2
(45) Date of Patent: Jun. 23, 2015

(54) METHOD FOR TRANSMITTING AND DISPLAYING IMAGES

(71) Applicants: Peter Goetzl, Kaumberg (AT); Michael Mass, Klosterneuburg (AT)

(72) Inventors: Peter Goetzl, Kaumberg (AT); Michael Mass, Klosterneuburg (AT)

(73) Assignee: Abalo Media Holding GmbH, Klosterneuburg/Scheilblingstein (AT)

( * ) Notice: Subject to any disclaimer, the term of this patent is extended or adjusted under 35 U.S.C. 154(b) by 0 days.

(21) Appl. No.: 14/131,975

(22) PCT Filed: Feb. 15, 2013

(86) PCT No.: PCT/AT2013/050040
§ 371 (c)(1),
(2) Date: Jan. 10, 2014

(87) PCT Pub. No.: WO2013/123541
PCT Pub. Date: Aug. 29, 2013

(65) Prior Publication Data
US 2014/0171043 A1    Jun. 19, 2014

Related U.S. Application Data

(60) Provisional application No. 61/646,599, filed on May 14, 2012.

(30) Foreign Application Priority Data

Feb. 20, 2012  (AT) .................................. A 212/2012
Mar. 5, 2012   (AT) .................................. A 275/2012
Nov. 22, 2012  (AT) ............................... A 50531/2012

(51) Int. Cl.
*H04W 4/02*   (2009.01)
*H04L 29/08*  (2006.01)
(Continued)

(52) U.S. Cl.
CPC ................. *H04W 4/02* (2013.01); *H04L 67/06* (2013.01); *H04L 67/22* (2013.01); *H04L 67/04* (2013.01);
(Continued)

(58) Field of Classification Search
CPC ....... H04L 67/06; H04L 67/22; H04W 4/001; H04W 4/02; G06Q 30/0241
USPC .......................... 455/414.1–414.4, 418–420
See application file for complete search history.

(56) References Cited

U.S. PATENT DOCUMENTS 6,363,419 B1    3/2002  Martin, Jr. et al.
2005/0080878 A1 4/2005  Cunningham et al.
(Continued)

FOREIGN PATENT DOCUMENTS

EP    1043905 A2    10/2000
EP    2071442 A2    6/2009

OTHER PUBLICATIONS

Samsung: "Samsung Galaxy 5 GT-I5503 User Manual", Samsung's User Manuals, Jul. 1, 2010, pp. 1-105, XP055025717, Retrieved from the Internet: URL:http://www.wirelesswave.ca/images/phones/188/downloads/samsung-galaxy-550-user-guide-english.pdf [retrieved on Apr. 26, 2012].

*Primary Examiner* — Kashif Siddiqui
(74) *Attorney, Agent, or Firm* — Laurence A. Greenberg; Werner H. Stemer; Ralph E. Locher

(57) ABSTRACT

Images are transmitted from a server through a cellular network and displayed on a mobile phone. After a predefined time of non-use or via input of a user command, the mobile phone is switched into an inactive mode. When an activating operation is performed, the phone is switched from inactive into locked active mode. An unlocking operation switches the phone from locked active into unlocked active mode. User input is accepted only in unlocked active mode. The server selects a number of images and transmits them to the mobile phone. One of the transmitted images is selected and kept available for display, during locked active mode, the selected image is displayed. A count indicates how many times an image has been displayed, and the count value for each image is transmitted from the mobile phone to the server.

22 Claims, 3 Drawing Sheets

(51) Int. Cl.
*H04W 4/00* (2009.01)
*G06Q 30/02* (2012.01)
*H04M 1/67* (2006.01)
*H04M 1/725* (2006.01)

(52) U.S. Cl.
CPC ............... *H04M 1/67* (2013.01); *H04W 4/001* (2013.01); *H04M 1/72544* (2013.01); *G06Q 30/0241* (2013.01)

(56) References Cited

U.S. PATENT DOCUMENTS

| | | |
|---|---|---|
| 2007/0069946 A1 | 3/2007 | Kaplan et al. |
| 2009/0116735 A1 | 5/2009 | Tsai |
| 2009/0156173 A1 | 6/2009 | Wang |
| 2014/0058941 A1* | 2/2014 | Moon et al. ..................... 705/42 |
| 2014/0380464 A1* | 12/2014 | Lee ................................. 726/19 |

* cited by examiner

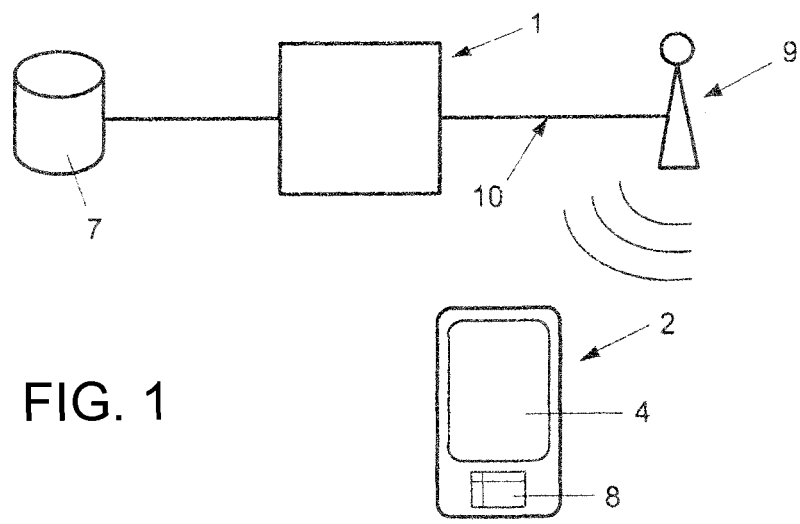
FIG. 1
FIG. 2
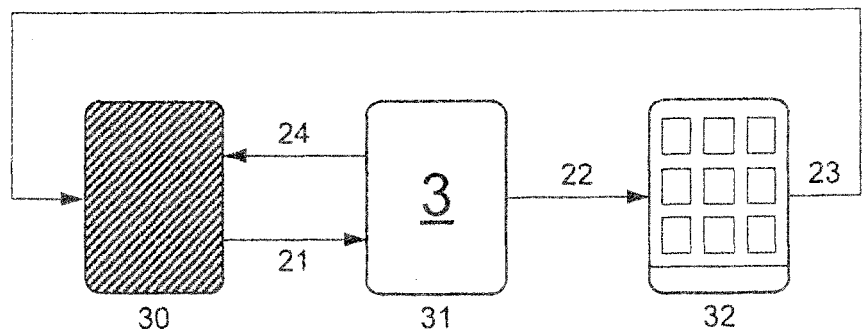

FIG. 3

| Image 1 | 15 | 140 | 180 s | 48°15' N 16°22' E |
| Image 2 | 41 | 231 | 520 s | 47°07' N 15°45' E |
| Image 3 | 0 | 0 | 0 s | 46°12' N 13°48' E |
| Image 4 | 231 | 2618 | 9843 s | 48°16' N 17°04' E |
| Image 5 | 1 | 3 | 20 s | 47°45' N 16°12' E |

FIG. 4

| Image 1 | 1 | 6 | 8 s | 48°15' N 16°22' E |
| Image 4 | 0 | 0 | 0 s | 48°16' N 17°04' E |

METHOD FOR TRANSMITTING AND DISPLAYING IMAGES

BACKGROUND OF THE INVENTION

Field of the Invention

This invention relates to a method for transmitting and representing images on at least one mobile phone and for determining the frequency of the representation of individual images by the mobile phone. The images are provided by a server in data communication with the mobile phone via a cellular network, and after a predefined time of non-use, or via input of a user command, the mobile phone is switched into an inactive mode. When an activating operation from the inactive mode is performed, the mobile phone is switched into a locked active mode, and when an unlocking operation from the locked active mode is performed, the mobile phone is switched into in an unlocked active mode, with the mobile phone accepting user input exclusively in unlocked active mode.

Such methods are commercially implemented in the field of transmitting commercial advertising on individual mobile phones.

In systems for transmitting images known from prior art, in particular for transmitting advertising images, there is frequently a problem in that when displayed on the mobile phone the images transmitted will interrupt the remaining program flow, in particular take too much priority, so that the user is disturbed or distracted by the image. This effect occurs in particular if advertising or other images are inserted from the side while occupying part of the screen as this action will cover or hide part of the screen. Also, selecting or setting a certain background image is often disadvantageous in that symbols represented on the background image are more difficult to see or cannot be found any more, or in that symbols represented on the background image are mistaken for program symbols and selected, thereby irritating the user.

BRIEF SUMMARY OF THE INVENTION

It is an object of the invention to solve the problems mentioned in the beginning and to make the user aware of the images transmitted in an unobtrusive manner, wherein in particular the program flow and operation of the mobile phone must not be disturbed by the representation of the respective image.

Furthermore, it is an object of the invention to ascertain how many times each user has viewed an image or how many times an image has been represented for a user on his or her mobile phone.

This problem is solved by the invention in a method of the type mentioned in the beginning having the features as claimed.

This invention relates to a method for transmitting and representing images on at least one mobile phone as well as for determining the frequency of the representation of individual images by the mobile phone. According to the invention, provision is made for the server to select a number of images and transmit said images to the mobile phone, for one of the images transmitted to the mobile phone by the server to be selected and made available for display, for the selected image to be displayed by the mobile phone during the locked active mode of the mobile phone, and for a count value to be established for each of the images transmitted to the mobile phone by the server, said value indicating how many times the respective image has been represented on the mobile phone, and for the respective count value for each of the images to be transmitted to the server by the mobile phone.

This procedure allows the user to be provided with the contents of the image, without operation of the mobile phone being affected by this action.

In order to ascertain how many times an image has been viewed in total, provision can be made for the server to determine for each of the images respectively one separate total count value corresponding to the sum of the count values established for the server by the mobile phones.

In order to prevent the same image from being displayed to a user, provision can be made for a maximum counter value to be transmitted for each image when the images are transmitted by the server to the respective mobile phone, said value specifying the maximum display frequency of the individual images, and in case the image has been displayed as many times as defined by the respective maximum count value for the image, display of the respective image is omitted, and a different image is selected for representation.

In order to display images to a user depending on his or her respective location, provision can be made for the location of the mobile phone to be determined by the mobile phone itself, in particular by means of a GPS, and for images to be transmitted to the mobile phone depending on this location, and if appropriate, for images already stored on the mobile phone to be deleted.

For the same purpose, provision can also be made for the location of the mobile phone to be determined by the mobile phone itself, in particular by means of a GPS, and for the individual images to be provided with location information and transmitted to the mobile phone, wherein from the images stored on the mobile phone the image selected is the one having associated location information closest to the established location of the mobile phone, or for the representation of the images to be done according to random criteria provided the selection of an image is more likely the closer the associated location information is to the established location of the mobile phone.

In order for interference of the program flow on the mobile phone to be kept to a minimum, provision can be made for the selected image to be displayed in locked active mode and to be hidden after an unlocking operation has been performed, or at a time situated after the unlocking operation by a predefined time interval.

In a mobile phone with several displays, for improved utilization of the display surface available, provision can be made advantageously for the selected image to be represented on the display or on at least one of the displays.

So as to count only representations of images which have actually been viewed by the respective user, provision can be made for an image to be regarded as represented only if it is displayed for more than a predefined minimum time interval, in particular one second.

For the same purpose, provision can be made for an image to be selected and represented only, or regarded as represented only if a minimum time interval, in particular 10 minutes, has elapsed since the last representation of an image.

In order to evaluate the intensity of the viewing of the respective image, provision can be made for the number of user activities to be established in locked active mode, to be associated with the respectively displayed image and transmitted to the server, with the server in particular determining the total number of all user activities performed while an image is being displayed, and making the same available, in particular separately for the respective image.

Alternatively or additionally, for the same purpose, provision can be made for the time interval of the locked active mode to be established, associated with the respectively displayed image, and transmitted to the server, with the server determining the total time interval of the display of an image, and making the same available, in particular separately for the respective image.

In order to enable globally ascertaining the activity of a user, provision can be made for the time interval between consecutive unlocking operations or between consecutive activating operations of the mobile phone to be determined and transmitted to the server, and for the server to provide the average time between respectively two consecutive unlocking operations or between two consecutive activating operations.

In view of resource-saving execution, provision can be made for the image selected after the unlocking operation during the unlocked active mode of the mobile phone to be the one represented in the subsequent locked active mode.

In order to allow for easy counting of the representation of the images stored on the mobile phone, provision can be made both for respectively one counter to be provided in the mobile phone and respectively one total counter to be provided in the server, with the counter associated with the respective image being increased by one when this image is represented, the value of the counter being transmitted as a count value to the server by the mobile phone, and the total counter being defined as the total value of the count values transmitted to the server by the mobile phone for the respective image, and made available.

As an alternative thereto, provision can be made for the respectively selected image to be deleted or tagged as represented after representation on the mobile phone, and for a message indicating this situation to be transmitted to the server by the mobile phone, and for the server to count the number of the messages having arrived separately for each of the images and provide the total count value thus established separately for each of the images, wherein in particular continued display of images already tagged as represented is omitted.

In order to make images preferably available for persons in specifically defined areas, provision can be made for respectively one item of location information to be indicated for each of the images in the form of a two-dimensional geometric surface area in the GPS coordinate system, and for an image to be selected and/or displayed if the mobile phone is located within the surface area.

In order to determine how long the respective viewer is actually viewing an image, provision can be made for a picture of the viewer, in particular of his or her face, to be taken by a camera, and for establishing for which time interval the viewer is viewing the display while the image is being displayed in locked active mode.

In order to ensure a given continuous time interval of viewing of an image by the user, provision can be made for an image to be regarded as represented only if the determined time interval during which the viewer has viewed the display without interruption is longer than a predefined minimum time interval, in particular one second.

In order to ensure a total period of time of the viewing of an image by the user, provision can be made for all of the time intervals during which the user has viewed the same image to be added up, and for a time interval to be established as a sum, and for an image to be regarded as represented only if the established time interval during which the viewer has viewed the display in total, possibly with interruptions, is longer than a predefined other minimum time interval, in particular comprised between 20 and 30 seconds.

In order to determine how long individual images are being viewed by a plurality of viewers, provision can be made for the respectively determined period of time or time interval for which the viewer has viewed the image to be associated with the respectively displayed image and possibly transmitted to the server, wherein the total viewing time of an image by all users is established by the server as a sum of the respective established periods of time or time intervals transmitted to the server, respectively associated with said image, with the server providing in particular the respective total viewing time separately for each image.

In order to avoid for the user to switch off the images immediately, provision can be made for the selected image to be displayed for a given display time after the unlocking operation has been performed and to be hidden again after this display time.

BRIEF DESCRIPTION OF THE SEVERAL VIEWS OF THE DRAWING

Hereafter, a practical sample embodiment of the invention with several variants will be represented in detail by means of the present figures of the drawings.

FIG. 1 shows a network comprising a central server as well as a mobile phone.

FIG. 2 schematically shows the modes of the mobile phone during the inactive mode until the transition to the unlocked active mode as well as subsequent locking of the mobile phone.

FIG. 3 schematically shows the contents of a database residing in the server.

FIG. 4 schematically shows the contents of a data storage list located within the mobile phone.

DESCRIPTION OF THE INVENTION

Figure 5:
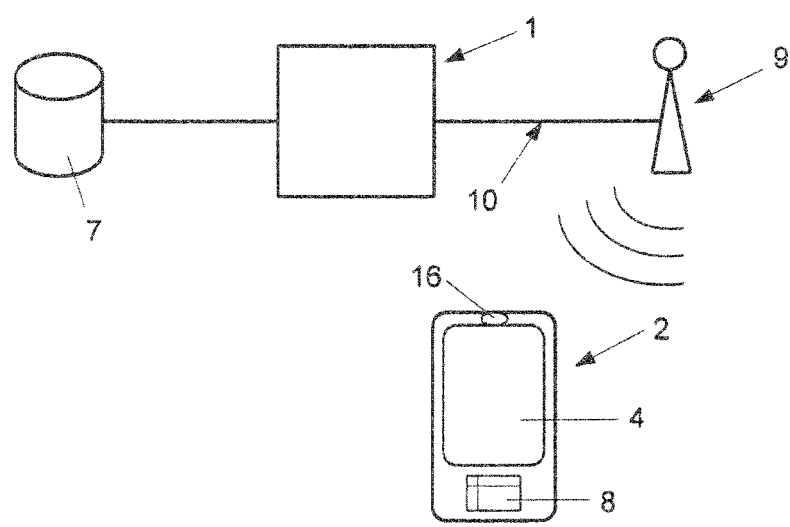
FIG. 5 shows a network comprising a central server as well as a mobile phone fitted with a camera.

In FIG. 1, the typical structure of a system for transmitting data between a central server 1 and a mobile phone 2 is represented. The mobile phone 2 has a display 4 for displaying images 3.

The server 1 is connected via a network 10 to a communication station 9 in wireless data communication with the mobile phone 2. The server 1 has a database 7, the mobile phone 2 has a data storage list 8.

In the database 7 of the server 1, a number of images 3 are stored which are to be transmitted to a plurality of users, e.g. for advertising purposes. In the database 7, each of the images 3 is respectively associated with a count value indicating how many times the respective image 3 has already been represented on one of the mobile phones 2. In the present sample embodiment, for determining the count value, respectively one counter 6 is used which is associated with the respective image 3 and indicates for the respective image 3 how many times it has been represented or displayed in total on one of the mobile phones 2 communicating with the server 1.

The images 3 stored in the database 7 are provided by the server to the individual mobile phones 2 of the users via a cellular network. Herein, the server 1 selects a number of images 3 from the database 7 and transmits said images 3 to the mobile phone 2.

In the present sample embodiment, the images 3 are additionally provided with further location information 11 which is stored in the database 7 and associated with the respective image 3. The location information indicates the geographic location of the respective image 3, for instance in the form of coordinates. In predefined time intervals, the respective mobile phone 2 respectively establishes its own location and transmits said location to the server 1. Depending on the respective location of the mobile phone 2, the server 1 selects images 3 the respective associated location information 11 is situated within a predefined environment around the established location of the mobile phone 2. In the present sample embodiment, images 3 are used which are associated with locations 11 situated within a perimeter of 100 m around the respective established location of the mobile phone 2. Alternatively, the perimeter around the location of the mobile phone 2 can be increased or decreased until a certain amount of images 3 has been established the respectively associated location 11 of which is situated within the respective perimeter. In case such an amount of images 3 cannot be established, it is also possible to transmit to the mobile phone 2 other images 3 the associated location information 11 of which is not situated in any direct geographic proximity with the location of the mobile phone. With the above described procedure, an image 3 is associated with a circular surface area. However, this surface area is not necessarily circular.

Alternatively, the location information 11 may also consist of one or more geometric surface areas in the two-dimensional GPS coordinate system, wherein all of the geographic coordinates within the geometric figures are then associated with the image 3. If the mobile phone 2 is located within the geometric surface areas associated with the image 3, the image 3 is transmitted and/or represented on the display 4 of the mobile phone 2 in locked active mode.

In this preferred example, the selection of the images 3 for display in locked active mode is such that for each image 3, a surface area in the form of one or more geometric figures is defined in the two-dimensional GPS coordinate system. The representation of the images 3 with one or more surface areas is only performed if the established location of the mobile phone 2 is situated within a surface area of the respective surface areas.

Alternatively, it may also be provided for part of the images 3 which are transmitted to the mobile phone 2 to be established based on the location information 11 thereof in comparison with the respective location of the mobile phone 2, and for the remaining images 3 to be selected and established independently from the respective location of the mobile phone 2.

Images 3 thus selected and/or established are transmitted by the server 1 to the mobile phone 2 and stored in a local data storage list 8 (FIG. 4) residing in the mobile phone 2.

For each image 3, respectively one count value, which can be determined by the mobile phone 2, is provided and indicates how many times the respective image 3 has already been displayed on the mobile phone 2. In the present sample embodiment, in the local data storage list 8, for each of the images 3 stored, respectively one local counter 5 is provided in which the respective count value is present as stored.

As represented in FIG. 2, the mobile phone 2 has three basic operating modes 30, 31, 32, namely an inactive operating mode 30, a locked active mode 31, as well as an unlocked active mode 32. When the mobile phone 2 is turned on, it is typically in the unlocked active mode 32. In this unlocked active mode 32, the mobile phone 2 accepts any user input, it is possible in particular to establish communications with other parties, various applications (apps) can be retrieved or selected, it is possible to send SMS, etc. In the mobile phone 2, it is possible to lock the same by performing a locking operation 23, for instance by entering a certain key combination. Also, it is possible for the mobile phone 2 to lock down automatically and to be put into locked mode 30, if for a predefined period of time no user activities are performed by the user. Locking 23 the mobile phone 2 or omitting operating activities of the mobile phone 2 will put the same into inactive mode 30, in this case the display 4 of the mobile phone 2 is switched off to be inactive or dark, basically no user input is accepted until an activating operation 21.

When an activating operation 21 is performed, the mobile phone 2 is transitions from inactive mode 30 to locked active mode 31. The activating operation 21 is for instance pushing a button or touching the touch screen 4. Once the mobile phone 2 has been transitioned by the activating operation 21 into the locked active mode 31, the selected image 3 will be represented on the display 4 of the mobile phone. Said selected image 3 is displayed during the entire locked active mode 31 of the mobile phone 2. While in locked active mode 31, the respective user proceeds to an unlocking operation 22 transitioning the mobile phone 2 from locked active mode 31 into unlocked active mode 32. In locked active mode 31, the mobile phone 2 exclusively accepts an unlocking operation 22, other operations being ignored, with the mobile phone 2 respectively staying in locked active mode 31. If during the locked active mode 31, no unlocking operations 22 are performed, upon expiry of a predefined time or in case of inactivity of the user, the mobile phone 2 will return to inactive mode 30 via deactivation 24. Once the unlocking operation 22 has been performed, the mobile phone 2 is placed into unlocked active mode 32, and the image 3 represented on the display 4 is hidden once the unlocking operation 22 has been performed. Alternatively in this case, provision can be made for the respective selected image 3 to stay represented for a predefined time range or a predefined time interval after the unlocking operation 22 and to be hidden only upon expiry of this time interval after the unlocking operation 22.

In an alternative embodiment of the invention, the selected image 3 is hidden via a fading method for a predefined period of time, with the background of the display 4 of the mobile phone 2, which is represented in unlocked active mode 32, progressively coming into the foreground.

In another alternative embodiment of the invention, the selected image 3 is only inserted after a predefined display time once the unlocking operation 22 has been performed, and hidden again when the display time has expired. The background of the display 4 of the mobile phone 2, which is represented in active unlocked mode, will come back to the foreground. It is particularly advantageous if the image moves into the foreground continuously as a fading process.

When the individual images 3 have been transmitted to the mobile phone 2, the mobile phone 2 will respectively select one image 3 to be displayed during the next locked active mode 31. The selection of the image 3 to be displayed is done from the latest images 3 transmitted by the server 1, and can be performed in different ways.

The choice of the respective image 3 to be represented during the next locked active mode 31 of the mobile phone 2 is in the present sample embodiment always done during the immediately preceding unlocked active mode, wherein the respective image 3 is selected directly and immediately after the unlocking operation 22 and is available from then on.

One possibility for making a choice from the images 3 transmitted by the server 1 can consist in selecting an image 3 at random.

Another possibility is for the location information 11 transmitted with the respective image to be compared to the location of the mobile phone 2 itself, currently established by the mobile phone 2. From the images 3 stored on the mobile phone 2, the image 3 selected is the one having associated location information 11 which are closest to the established location of the mobile phone.

Alternatively, the choice of the image 3 to be displayed can also be done according to random criteria, wherein the choice of an image 3 is all the more probable the closer the location information 11 thereof is to the established location of the mobile phone 2.

In all of the represented selection mechanisms, there is the possibility to avoid that an image 3 is displayed too frequently, that when the images 3 are transmitted from the server 1 to the respective mobile phone 2, respectively for each of the images 3, a maximum count value is transmitted specifying the maximum display frequency of the individual image 3. It is verified, respectively, whether the respective image 3 selected for display has already been displayed as many times as defined by the respective maximum count value for the respective image 3. In this case, display of the respective image 3 is omitted, and another image 3 is selected for representation. This other image 3 can be established for instance by repeated retrieval of the random method or can consist in selecting not the image 3 with the location information 11 closest to the location of the mobile phone 2, but the image with the second closest, third closest, fourth closest coordinates.

For each of the images 3 transmitted to the mobile phone 2 by the server 1, a count value is established indicating how many times the respective image 3 has been represented on the mobile phone 2. In the present sample embodiment, a counter 5 is used for this purpose, which is increased by 1, respectively, when the image 3 has been displayed in locked active mode. Once the count value has been increased, a message to this effect is transmitted to the server 1 by the mobile phone 2. For each of the images 3, in the database 7 (FIG. 3) of the server 1, respectively one separate total counter value 6 is available which corresponds to the sum of count values 5 established for the server 1 by the mobile phones.

One possibility for establishing the count value for an image 3 stored on the mobile phone 2 is to implement in the database 7 for each record with one image 3, respectively one counter 6 associated with the respective image 3.

Alternatively, there is also the possibility for the respective image 3 to be deleted after representation on the mobile phone 2 or to be tagged as represented, and for a message designating this situation to be transmitted to the server 1 by the mobile phone 2. In this case, the mobile phone 2 may ascertain the respective count value by checking the existence of the respective image file, and if the respective image 3 in the memory of the mobile phone 2 or the respective tag is available, a related count value is delivered which in this case may simply have the value 0 or 1.

When the respective message has been transmitted by the mobile phone 2 to the server 1, the total count value for the respective image 3 is incremented, respectively, with a counter 6 being provided advantageously for the respective total count value.

In the present sample embodiment, an image 3 is only regarded as represented if it has been represented in locked active mode 31, and the locked active mode 31 has lasted longer than a predefined minimum time interval of 1 second. Thereby it can be avoided that the user ignores the image 3 represented and performs the unlocking operation very quickly.

In addition, in the present sample embodiment, it is avoided that the user views a plurality of different images 3 in rapid succession. This is obtained in that an image 3 is only selected and represented, or is only regarded as represented, if a minimum time interval of 10 minutes has elapsed since the last representation of an image 3 on the display 4 of the mobile phone 2.

In locked active mode 31, the number of operating activities performed by the user is established and associated with the respective image 3. The number of user activities is associated as a distinct data field 12 with the record of the respective image 3 and stored in a separate memory in the data storage list 8 of the mobile phone 2 and transmitted to the server 1 together with the other information regarding the image 3, in particular the number of representations. The server 1 establishes the total number of all user activities performed during the display of an image of the users of all mobile phones 2 and keeps it available for further usage. In this case, the database 7 of the server 1 respectively has a data field 13 for summing user activities performed during the display of an image 3. For each of the images 3 stored in the database 7 of the server 1, thus, respectively the total number of all user activities performed during the display of the image 3 is available.

Moreover, the time interval is also established for which the respective image 3 was displayed during locked active mode 31. This time interval is established separately for each of the images 3 displayed, and is respectively transmitted to the server 1 by the mobile phone 2. For each image 3, a distinct data field 14 in the data storage list 8 of the mobile phone 2 is created on the mobile phone 2, where the respective display contents of the image 3 is stored. The server 1 calculates the total time interval of the display of each image 3 separately and keeps the time interval of display available separately for all of the images 3, respectively, wherein for each image 3, a distinct data field 15 is created in the database 7 of the server 1.

Moreover, the time interval between consecutive unlocking operations or between consecutive activating operations of the mobile phone 2 is established, and this time interval is respectively transmitted to the respective server 1 when unlocking or activating has been performed. The server 1 keeps the average time between respectively two consecutive unlocking operations or two consecutive activating operations available.

In FIG. 5, a further alternative embodiment of an inventive method is represented schematically. This method corresponds to the method already presented, wherein hereafter, additional features and distinctions will be discussed.

This mobile phone 2 has a vision recognition unit 16 which can recognize whether the user is looking at the display 4. One such vision recognition unit 16 is disclosed for instance in the US patent application US 2011/0074822 A1 (Yao-Tsung Chang) and has a camera as well as a processing unit connected downstream of the camera, which recognizes faces, in particular eyes, from the respective image taken by the camera and identifies the viewing direction of the eyes. In particular, the vision recognition unit 16 can recognize whether the eyes of a person represented in the image of the camera are directed towards the mobile phone 2. In this case, the vision recognition unit 16 delivers a related viewing signal.

By using the vision recognition unit 16, it is now also possible to ascertain for how long the respective user is viewing the image 3 represented on the display 4. In contrast to the previous sample embodiment of the invention, an image 3 is only regarded as represented if it has been represented in locked active mode 31 and if the vision recognition unit 16 has ascertained that the user has viewed the respective image 3 for more than a predefined minimum time interval of 1 second. The respective time interval is established for which the respective user has viewed the image 3, and this time interval is associated with the image.

Alternatively or additionally, an image 3 can also be regarded as viewed and can only be tagged as selected and represented if the represented image 3 has been viewed in total, i.e. even with multiple viewing by the user, for a cumulated period of time of 30 seconds.

In principle, a timing unit, not shown, may be associated with or connected downstream of the vision recognition unit 16, determining how long the user has viewed the respective image and how long the viewing signal of the vision recognition unit 16 has been active. As a timing unit, for instance a timer or counter can be used, the value of which is incremented when the viewing signal is applied, starting with an initial value. Thereby, both the time interval mentioned above and the period mentioned above can be established.

The following considerations can be made both with the established time interval or with the established period of time, which will hereafter be generically designated as the viewing time. The viewing time established for the respective image 3 is associated with the respective image 3. In order to determine how long individual images 3 have been viewed in total by users of all mobiles phones 2 connected to the server 1, the individual viewing time intervals or periods of time stored in the mobile phones 2 and associated with the images 3 are transmitted to the server 1 together with an identifier of the respective image 3. All of the periods of time transmitted and associated with the same image 3, respectively, as well as the same identifier, are added by the server 1, and associated with the identifier of the respective image 3 as the total viewing time. The server 1 keeps the respective total viewing time available for later access for each image 3 separately.

The invention claimed is:

1. A method for transmitting and displaying images on a mobile phone,
   wherein the mobile phone is switched into an inactive mode after a predefined time of non-use or in response to an input of a user command, the mobile phone is switched from the inactive mode into a locked active mode in response to an activating operation, and the mobile phone is switched from the locked active mode into an unlocked active mode in response to an unlocking operation, wherein the mobile phone accepts user input exclusively in the unlocked active mode;
   the method comprising the following steps:
   providing the images by a server in data communication with the mobile phone via a cellular network, and thereby selecting a number of images and transmitting the images from the server to the mobile phone;
   selecting with the server one of the images transmitted to the mobile phone and keeping the selected image available for display;
   displaying the selected image by the mobile phone during the locked active mode of the mobile phone;
   determining a count value for each of the images transmitted from the server to the mobile phone, the count value indicating how many times the respective image has been displayed on the mobile phone; and
   transmitting a respective count value for each of the images from the mobile phone to the server.

2. The method according to claim 1, which comprises determining with the server for each of the images, respectively, a separate total count value corresponding to a sum of the count values established for the server by the mobile phones.

3. The method according to claim 1, which comprises, upon transmission of the images from the server to the respective mobile phone, for each of the images transmitting a maximum counter value specifying a maximum display frequency of the individual image, and in case the count value of the image reaches the respective maximum count value, ceasing display of the respective image and selecting another image for display.

4. The method according to claim 1, wherein a location of the mobile phone is determined by the mobile phone itself, and transmitting the images to the mobile phone depending on the location and, if appropriate, deleting images already stored on the mobile phone.

5. The method according to claim 1, wherein the location of the mobile phone is determined by the mobile phone itself and the individual images are provided with location information and transmitted to the mobile phone;
   wherein from the images stored on the mobile phone, the image selected is the one having associated location information closest to a location determined by the mobile phone; or
   wherein display of the images is effected according to random criteria provided that the selection of an image is more likely the closer the associated location information thereof is to the established location of the mobile phone; or
   wherein, for each of the images, respectively one piece of location information in the form of a two-dimensional geometric surface area in a GPS coordinate system is indicated, and an image is selected for display if the mobile phone is located within the surface area.

6. The method according to claim 1, which comprises displaying the selected image in locked active mode, and hiding the image in response to the unlocking operation, or at a time following the unlocking operating by a predefined time interval.

7. The method according to claim 1, wherein the mobile phone has at least one display and the selected image is represented on the at least one display, or if the mobile phone has a plurality of displays, the selected image is displayed on at least one of the displays.

8. The method according to claim 1, which comprises counting an image as having been displayed only if the image has been displayed for more than a predefined minimum time interval.

9. The method according to claim 1, which comprises selecting and displaying an image, or regarding the image as having been represented, only if a minimum time interval has elapsed since a last display of an image.

10. The method according to claim 1, which comprises, in locked active mode, establishing a number of user activities, associated with the image respectively displayed, and transmitting the number to the server, and establishing with the server a total number of all user activities performed while an image is being displayed, and providing the same separately for the respective image.

11. The method according to claim 1, which comprises establishing a time interval of the locked active mode, associating with the image respectively being displayed, and transmitting same to the server, establishing with the server a total time interval of display of the image, and providing the total time separately for the respective image.

12. The method according to claim 1, which comprises establishing a time interval between consecutive unlocking operations or between consecutive activating operations of the mobile phone, and transmitting same to the server, and providing with the server an average time between respectively two consecutive unlocking operations or between two consecutive activating operations.

13. The method according to claim 1, wherein after the unlocking operation during the unlocked active mode of the mobile phone, the image selected is the one represented during a next locked active mode.

14. The method according to claim 1, which comprises providing for each of the images a counter in the mobile phone and a total counter in the server, increasing the counter associated with the respective image by one when the image is displayed, transmitting a value of the counter as a count value from the mobile phone to the server, and defining the total counter as a total value of the count values transmitted for the respective image from the mobile phone to the server, and keeping the total value available.

15. The method according to claim 1, which comprises, after representation on the mobile phone, deleting the respective selected image or tagging the image as represented, and transmitting a corresponding message from the mobile phone to the server, and counting with the server a number of messages received separately for each of the images and providing a total count value thus established separately for each of the images, and, optionally, omitting any further display of images so tagged as already represented.

16. The method according to claim 1, which comprises taking a picture of a user with a camera, and determining a time interval during which the user is viewing the display while the image is being displayed in the locked active mode.

17. The method according to claim 16, wherein an image is only regarded as represented if the established time interval for which the user has viewed the display without interruption is longer than a predefined minimum time interval.

18. The method according to claim 16, which comprises adding up all of the time intervals for which the user is viewing a given image, and establishing a period of time as the sum, and considering an image as having been displayed only if the established period of time for which the user has viewed the display in total, optionally even with interruptions, is longer than a predefined minimum time interval.

19. The method according to claim 15, which comprises associating the respectively established period of time or time interval for which the user has viewed the image with the respectively displayed image and transmitting same to the server if appropriate; and wherein a total viewing time of an image by all users is established as a sum of the established periods of time or time intervals, respectively associated with the image and transmitted to the server, and wherein the server provides the respective total viewing time separately for each image.

20. The method according to claim 1, which comprises displaying the selected image for a given display time when the unlocking operation has been performed, and hiding the selected image after the given display time.

21. A non-transitory data medium, comprising program code stored thereon in non-transitory form for executing the method steps to be performed on a mobile phone of the method according to claim 1.

22. A non-transitory data medium, comprising program code stored in non-transitory form of a program for executing the method steps to be performed on the server of the method according to claim 1.

* * * * *